United States Patent
Onishi et al.

(10) Patent No.: US 11,444,293 B2
(45) Date of Patent: Sep. 13, 2022

(54) FLOW PASSAGE STRUCTURE OF FUEL CELL SYSTEM

(71) Applicant: TOYOTA JIDOSHA KABUSHIKI KAISHA, Toyota (JP)

(72) Inventors: Hirofumi Onishi, Aichi-gun (JP); Yugo Ichida, Seto (JP); Taichi Edo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 99 days.

(21) Appl. No.: 17/109,852

(22) Filed: Dec. 2, 2020

(65) Prior Publication Data

US 2021/0226232 A1    Jul. 22, 2021

(30) Foreign Application Priority Data

Jan. 20, 2020 (JP) .............................. JP2020-006724

(51) Int. Cl.
*H01M 8/04089* (2016.01)
*H01M 8/04082* (2016.01)
*H01M 8/04746* (2016.01)

(52) U.S. Cl.
CPC ... *H01M 8/04089* (2013.01); *H01M 8/04201* (2013.01); *H01M 8/04753* (2013.01); *H01M 2250/20* (2013.01)

(58) Field of Classification Search
CPC ................................................ H01M 8/04089
See application file for complete search history.

(56) References Cited

U.S. PATENT DOCUMENTS

| | | | |
|---|---|---|---|
| 2003/0148167 A1* | 8/2003 | Sugawara | H01M 8/04097 429/415 |
| 2006/0073367 A1* | 4/2006 | Kanno | H01M 8/04303 429/429 |
| 2010/0136454 A1* | 6/2010 | Heidrich | H01M 8/04097 429/513 |
| 2013/0164643 A1* | 6/2013 | Heo | H01M 8/04082 181/272 |

FOREIGN PATENT DOCUMENTS

| | | |
|---|---|---|
| JP | 2007-280696 A | 10/2007 |
| JP | 2020-087706 A | 6/2020 |

* cited by examiner

*Primary Examiner* — Brian R Ohara
(74) *Attorney, Agent, or Firm* — Hunton Andrews Kurth LLP

(57) ABSTRACT

Provided is a flow passage structure that is employed in a fuel cell system and includes a hydrogen gas pipe, a hydrogen off-gas pipe, a supply pipe, a lead-out pipe, and a plurality of junctions. The lead-out pipe includes a first wall located between an inner wall and a central axis of the supply pipe, a second wall connected to the first wall and located between the first wall and the central axis, and a first region surrounded by the first wall and the second wall, and is configured such that a second region between the inner wall and the first wall and a third region on the side of the central axis from the second wall communicate with each other. At the junctions, the first region and a leading end part of the hydrogen gas pipe communicate with and connect to each other.

5 Claims, 16 Drawing Sheets

FLOW PASSAGE STRUCTURE OF FUEL CELL SYSTEM

CROSS-REFERENCE TO RELATED APPLICATION

This application claims priority to Japanese Patent Application No. 2020-006724 filed on Jan. 20, 2020, incorporated herein by reference in its entirety.

BACKGROUND

1. Technical Field

This disclosure relates to a flow passage structure of a fuel cell system.

2. Description of Related Art

Japanese Patent Application Publication No. 2007-280696 (JP 2007-280696 A) discloses a technique for mixing a hydrogen off-gas and a hydrogen gas together and supplying the mixed gas to a fuel cell stack in a fuel cell system. This technique involves adjusting the flow direction of the hydrogen gas ejected from a hydrogen off-gas pipe such that the hydrogen off-gas and the hydrogen gas are well mixed together before the hydrogen gas reaches a wall of the hydrogen off-gas pipe. As a result, water contained in the hydrogen off-gas is less likely to freeze by being cooled by the hydrogen gas having a lower temperature than the hydrogen off-gas.

SUMMARY

There has been a demand for a technique that can further reduce the likelihood of freezing of water contained in a hydrogen off-gas by using a structure that is new and different from that of JP 2007-280696 A.

This disclosure has been contrived to solve the above challenge and can be implemented in the following forms.

(1) As a first form of this disclosure, a flow passage structure is provided that is employed in a fuel cell system to supply to a fuel cell stack a hydrogen gas supplied from a hydrogen gas supply source and a hydrogen off-gas supplied from a hydrogen pump. This flow passage structure includes: a hydrogen gas pipe connected to the hydrogen gas supply source; a hydrogen off-gas pipe connected to the hydrogen pump; a supply pipe which connects the hydrogen off-gas pipe and the fuel cell stack to each other, into which a leading end part of the hydrogen gas pipe is introduced, and through which a mixed gas of the hydrogen gas from the hydrogen gas pipe and the hydrogen off-gas from the hydrogen off-gas pipe is supplied to the fuel cell stack; a lead-out pipe that is disposed inside the supply pipe along a central axis of the supply pipe to lead out the hydrogen gas from the hydrogen gas pipe into the supply pipe, the lead-out pipe including a first wall located between an inner wall and the central axis of the supply pipe, a second wall connected to the first wall and located between the first wall and the central axis, and a first region surrounded by the first wall and the second wall, the lead-out pipe being configured such that a second region between the inner wall and the first wall and a third region on the side of the central axis from the second wall communicate with each other; and a plurality of junctions at which the first region and the leading end part of the hydrogen gas pipe communicate with and connect to each other.

In this form, the hydrogen off-gas supplied from the hydrogen pump flows through the second region between the inner wall of the supply pipe and the first wall of the lead-out pipe and through the third region on the side of the central axis from the second wall of the lead-out pipe. Thus, the temperature of the hydrogen gas flowing through the first region surrounded by the first wall and the second wall of the lead-out pipe can be raised by the hydrogen off-gas flowing through the second region and the third region. As a result, when the hydrogen gas having a lower temperature than the hydrogen off-gas and the hydrogen off-gas containing water and having a higher temperature than the hydrogen gas mix together, the water contained in the hydrogen off-gas is less likely to freeze. Having the plurality of junctions at which the lead-out pipe and the leading end part of the hydrogen gas pipe connect to each other, this flow passage structure can reduce the difference in the flow velocity of the hydrogen gas in the first region of the lead-out pipe, compared with a structure having only one junction. Accordingly, this structure can reduce the difference in the concentration of the hydrogen gas in the mixed gas of the hydrogen gas and the hydrogen off-gas that reaches the fuel cell stack, compared with a structure having only one junction.

(2) In the first form, the lead-out pipe may have a plurality of divided first regions, and may be configured such that the second region and the third region communicate with each other at a plurality of points through portions between the divided first regions. At each of the junctions, one of the divided first regions and the leading end part of the hydrogen gas pipe may connect to each other.

In this form, the hydrogen off-gas can flow into the third region, located on the side of the central axis from the second wall, from a plurality of points. Thus, the temperature of the hydrogen gas flowing through the first region can be further raised, so that when the hydrogen gas having a lower temperature than the hydrogen off-gas and the hydrogen off-gas containing water and having a higher temperature than the hydrogen gas mix together, the water contained in the hydrogen off-gas is even less likely to freeze.

(3) As a second form of this disclosure, a flow passage structure is provided that is employed in a fuel cell system to supply to a fuel cell stack a hydrogen gas supplied from a hydrogen gas supply source and a hydrogen off-gas supplied from a hydrogen pump. This flow passage structure includes: a hydrogen gas pipe connected to the hydrogen gas supply source; a hydrogen off-gas pipe connected to the hydrogen pump; a supply pipe which connects the hydrogen off-gas pipe and the fuel cell stack to each other, into which a leading end part of the hydrogen gas pipe is introduced, and through which a mixed gas of the hydrogen gas from the hydrogen gas pipe and the hydrogen off-gas from the hydrogen off-gas pipe is supplied to the fuel cell stack; a lead-out pipe that is disposed inside the supply pipe along a central axis of the supply pipe and connected to the leading end part of the hydrogen gas pipe to lead out the hydrogen gas from the hydrogen gas pipe into the supply pipe, the lead-out pipe including a first wall located between an inner wall and the central axis of the supply pipe, a second wall connected to the first wall and located between the first wall and the central axis, and a first region surrounded by the first wall and the second wall, the lead-out pipe being configured such that a second region between the inner wall and the first wall and a third region on the side of the central axis from the second wall communicate with each other; and a junction at which the first region and the leading end part of the hydrogen gas pipe communicate with and connect to each other. The lead-out pipe is formed such that the length of at least one of the first wall and the second wall along the central axis is shorter at a position in a leading end part of the lead-out pipe that corresponds to the position of the junction than at a position that does not.

In this form, the hydrogen off-gas supplied from the hydrogen pump flows through the second region between the inner wall of the supply pipe and the first wall of the lead-out pipe and through the third region on the side of the central axis from the second wall. Thus, the temperature of the hydrogen gas flowing through the first region surrounded by the first wall and the second wall of the lead-out pipe can be raised by the hydrogen off-gas flowing through the second region and the third region. As a result, when the hydrogen gas having a lower temperature than the hydrogen off-gas and the hydrogen off-gas containing water and having a higher temperature than the hydrogen gas mix together, the water contained in the hydrogen off-gas is less likely to freeze. Since the leading end part of the lead-out pipe is formed such that the length of at least one of the first wall and the second wall is shorter at the position in the lead-out pipe that corresponds to the position of the junction than at a position that does not, the flow velocity of the hydrogen gas led out into the hydrogen off-gas pipe is less likely to become higher at the position corresponding to the position of the junction than at other positions. Thus, the difference in the flow velocity of the hydrogen gas in the first region of the lead-out pipe can be reduced, so that the difference in the concentration of the hydrogen gas in the mixed gas of the hydrogen gas and the hydrogen off-gas that reaches the fuel cell stack can be reduced.

(4) In the second form, the first region and the leading end part of the hydrogen gas pipe may communicate with and connect to each other at the junction, at least on the opposite side of the central axis from an inflow point at which the hydrogen off-gas flows from the hydrogen off-gas pipe into the supply pipe. The lead-out pipe may be formed such that the length of at least one of the first wall and the second wall along the central axis is shorter at least at a position in the leading end part of the lead-out pipe that corresponds to the position of the junction on the opposite side from the inflow point than at a position that does not.

In this form, compared with when the length of at least one of the first wall and the second wall is shorter on the side closer to the inflow point of the hydrogen off-gas, the hydrogen off-gas is less likely to flow into the first region from the portion where the wall is shorter. Thus, the flow of the hydrogen gas in the first region is less likely to be obstructed by the hydrogen off-gas.

(5) In the second form, the first region and the leading end part of the hydrogen gas pipe may connect to each other at a plurality of junctions.

The flow passage structure of this form can reduce the difference in the flow velocity of the hydrogen gas in the first region of the lead-out pipe, compared with a structure having only one junction. Accordingly, this structure can reduce the difference in the concentration of the hydrogen gas in the mixed gas of the hydrogen gas and the hydrogen off-gas that reaches the fuel cell stack, compared with a structure having only one junction.

This disclosure can be implemented in various forms, examples of which include a fuel cell system having a flow passage structure, a fuel cell vehicle, and a method of controlling a fuel cell system installed in a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
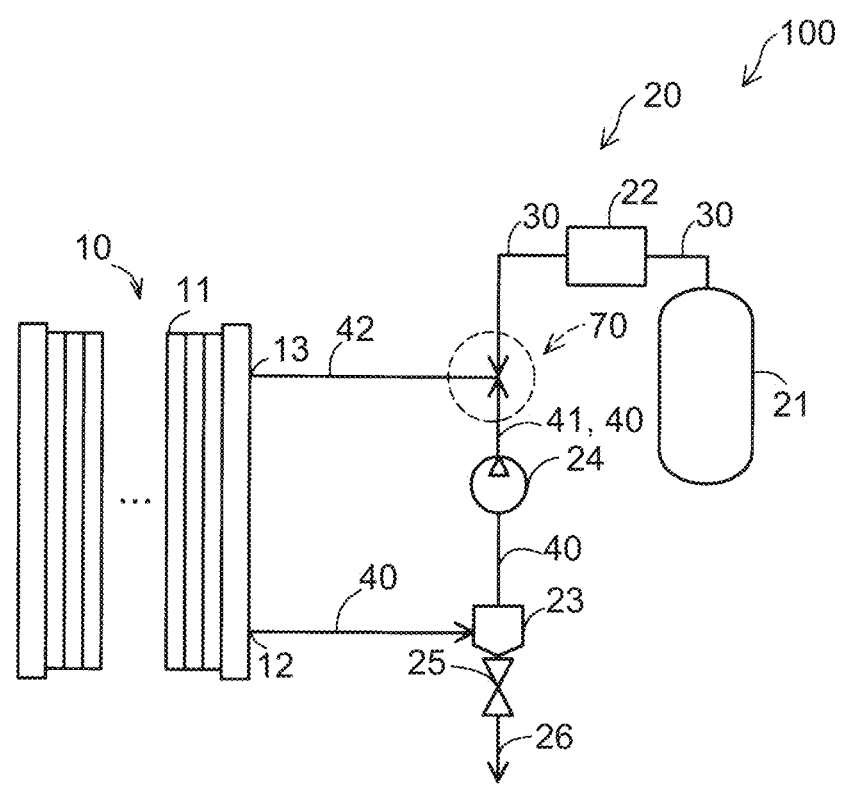
FIG. 1 is a view showing a schematic configuration of a fuel cell system.

FIG. 1 is a view showing a schematic configuration of a fuel cell system 100 as one embodiment of this disclosure. In this embodiment, the fuel cell system 100 is installed in a vehicle and, upon request from a driver, outputs electricity that powers the vehicle.

The fuel cell system 100 includes a fuel cell stack 10 and a hydrogen gas supply system 20 that supplies a hydrogen gas as an anode gas. Although this is not shown, the fuel cell system 100 further includes a compressor that supplies air to the fuel cell stack 10, a cathode gas supply system including a cathode gas pipe etc., and a controller that controls the supply systems and other parts of the fuel cell system 100.

The fuel cell stack 10 is formed by a stack of a plurality of cells 11. Each cell 11 has a membrane-electrode assembly that is composed of an electrolyte membrane and electrodes disposed one on each surface of the electrolyte membrane, and separators that are disposed one on each surface of the membrane-electrode assembly. The cells 11 generate electricity by being supplied with a hydrogen gas and air.

Figure 2:
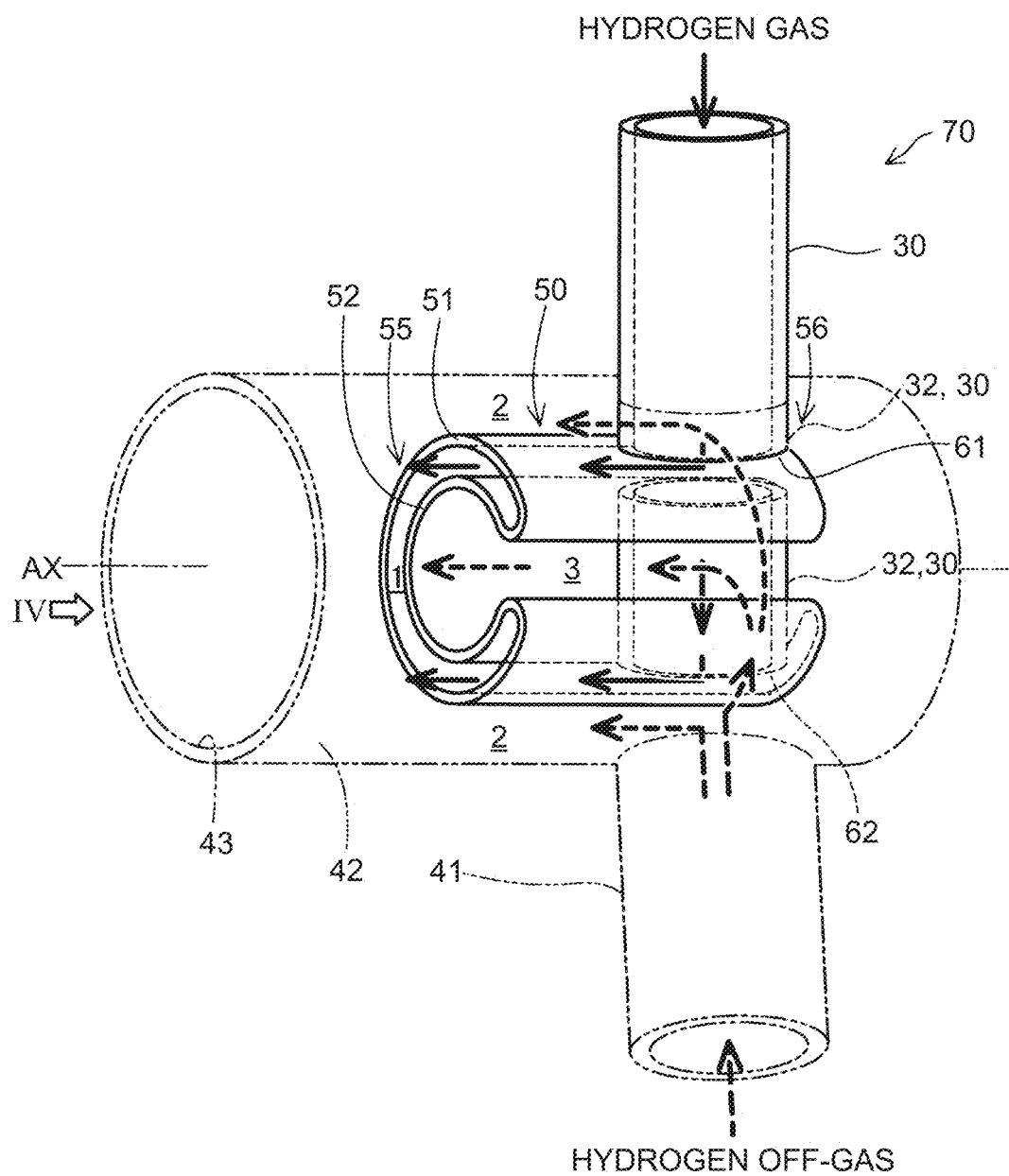
FIG. 2 is an enlarged view of a flow passage structure in a merging zone of a hydrogen gas and a hydrogen off-gas.

The hydrogen gas supply system 20 includes a hydrogen gas tank 21, an injector 22, a gas-liquid separator 23, a hydrogen pump 24, a hydrogen gas pipe 30, a hydrogen off-gas pipe 40, a supply pipe 42, and a lead-out pipe 50 that is shown in detail in FIG. 2 and the subsequent drawings.

The hydrogen gas tank 21 stores a hydrogen gas under a high pressure of about 70 MPa. The temperature of the hydrogen gas supplied from the hydrogen gas tank 21 via a pressure reducing valve is, for example, minus 40 degrees. The hydrogen gas pipe 30 is a pipe connected to the hydrogen gas tank 21 and the lead-out pipe 50 to be described later. A leading end part of the hydrogen gas pipe 30 is introduced into the supply pipe 42. The hydrogen gas pipe 30 is provided with the injector 22. The injector 22 ejects a hydrogen gas supplied from the hydrogen gas tank 21 toward a downstream side. The hydrogen gas tank 21 and the injector 22 are also called "hydrogen gas supply sources."

The hydrogen off-gas pipe 40 is a pipe that is connected to an anode-side gas outlet 12 of the fuel cell stack 10 and the supply pipe 42. The hydrogen off-gas pipe 40 is provided with the gas-liquid separator 23 and the hydrogen pump 24 in this order from the side of the gas outlet 12. A part of the hydrogen off-gas pipe 40 that connects the hydrogen pump 24 and the supply pipe 42 to each other is also called a "hydrogen off-gas pipe 41." The gas-liquid separator 23 separates water from the hydrogen off-gas discharged from the gas outlet 12 and stores the water. When a gas-water discharge valve 25 provided under the gas-liquid separator 23 is opened, the water stored in the gas-liquid separator 23 is discharged through a discharge pipe 26 that is connected to the gas-water discharge valve 25. The hydrogen pump 24 returns the hydrogen off-gas discharged from the gas outlet 12 to the fuel cell stack 10 through the supply pipe 42. The temperature of the hydrogen off-gas discharged from the gas outlet 12 is, for example, about 80 degrees.

The supply pipe 42 is a pipe that is connected to the hydrogen off-gas pipe 40 and an anode-side gas inlet 13 of the fuel cell stack 10. The leading end part of the hydrogen gas pipe 30 is located inside the supply pipe 42.

The part circled with the dashed line in FIG. 1 is a part where the hydrogen gas that is supplied from the hydrogen gas tank 21 and the injector 22 and flows through the hydrogen gas pipe 30 and the hydrogen off-gas that is supplied from the hydrogen pump 24 and flows through the hydrogen off-gas pipe 41 merge together. This part is also called a "merging zone 70." A gas resulting from the hydrogen gas and the hydrogen off-gas mixing together is also called a "mixed gas." The mixed gas is supplied to the fuel cell stack 10 through the supply pipe 42 via the gas inlet 13.

Figure 3:
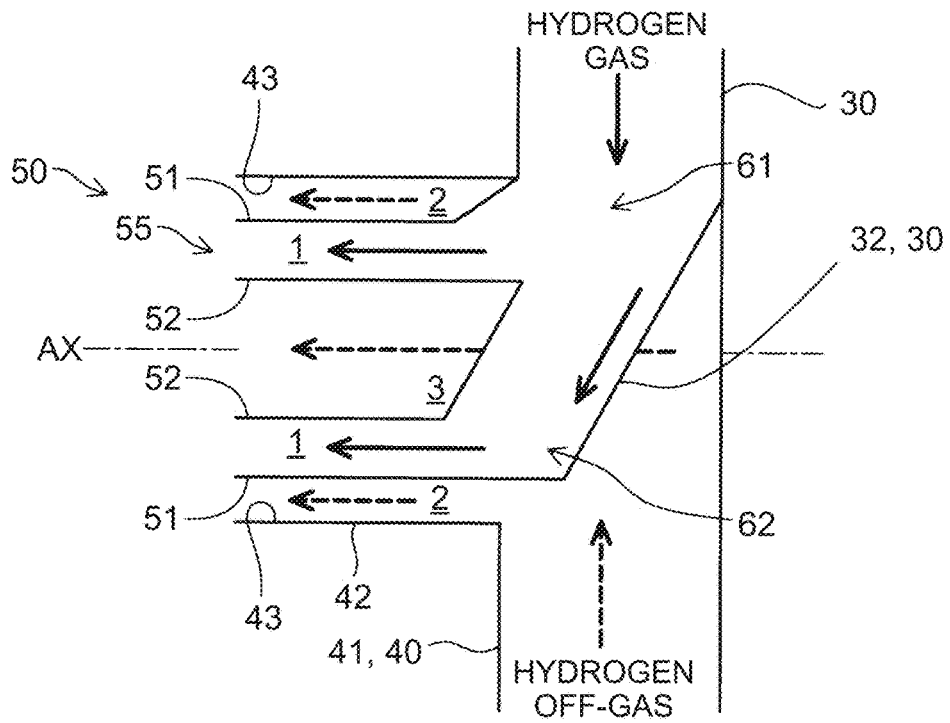
FIG. 3 is a schematic view showing flow passages of the hydrogen gas and the hydrogen off-gas in the merging zone.
Figure 4:
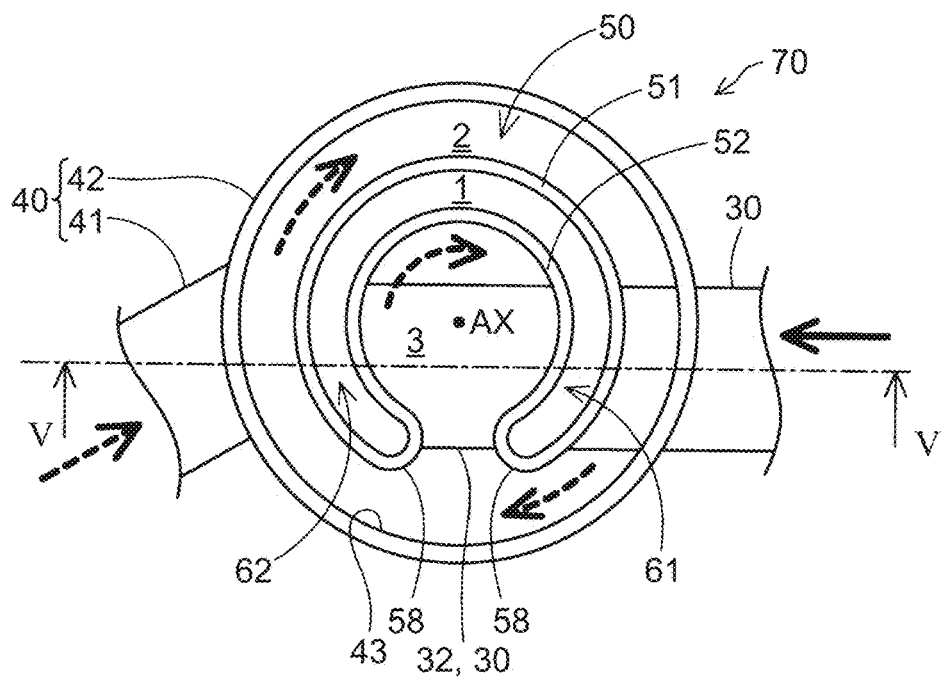
FIG. 4 is a view of the merging zone shown in FIG. 2, as seen from the direction of arrow IV.
Figure 5:
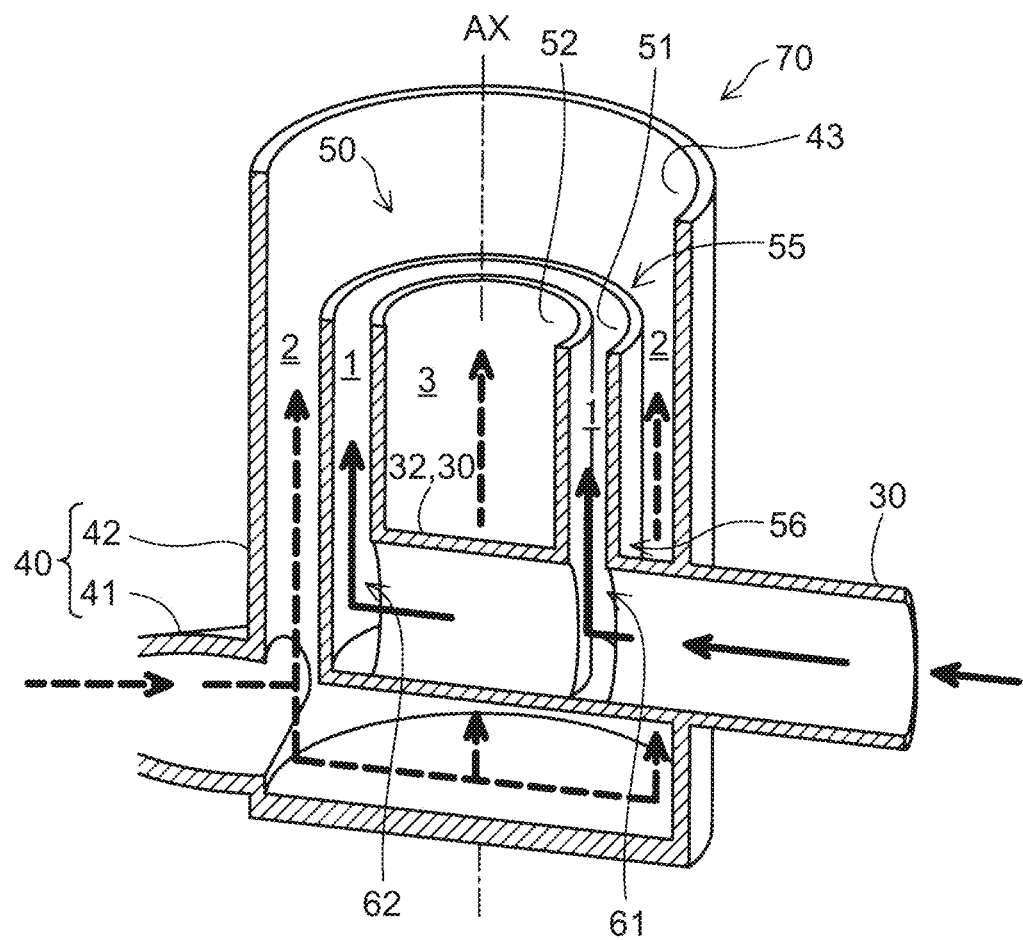
FIG. 5 is a sectional view taken along line V-V of FIG. 4.

FIG. 2 is an enlarged view of the flow passage structure in the merging zone 70. In FIG. 2, the hydrogen off-gas pipe 41 and the supply pipe 42 are indicated by long dashed double-short dashed lines to clearly show the structures of the hydrogen gas pipe 30 and the lead-out pipe 50. FIG. 3 is a schematic view showing the flow passages of the hydrogen gas and the hydrogen off-gas in the merging zone 70. FIG. 4 is a view of the merging zone 70 shown in FIG. 2, as seen from the direction of arrow IV. FIG. 5 is a sectional view taken along line V-V of FIG. 4. In the following, a flow passage structure for mixing the hydrogen gas and the hydrogen off-gas together in the merging zone 70 will be described using FIG. 2 to FIG. 5.

As shown in FIG. 2, the hydrogen gas pipe 30, the hydrogen off-gas pipe 41, the supply pipe 42, and the lead-out pipe 50 disposed inside the supply pipe 42 are located in the merging zone 70. The hydrogen gas pipe 30 extends through an inner wall 43 of the supply pipe 42, and a leading end part 32 of the hydrogen gas pipe 30 is introduced into the supply pipe 42. The leading end part 32 of the hydrogen gas pipe 30 and the lead-out pipe 50 communicate with and connect to each other at junctions 61, 62.

The lead-out pipe 50 is disposed inside the supply pipe 42 along a central axis AX of the supply pipe 42, with a leading end part 55 of the lead-out pipe 50 located on the side of the fuel cell stack 10. The side of the fuel cell stack 10 is the left side in the sheet of FIG. 2. The central axis AX is an axis passing through the center of the inside diameter of the supply pipe 42. The lead-out pipe 50 includes a first wall 51 located between the inner wall 43 and the central axis AX of the supply pipe 42, and a second wall 52 located between the first wall 51 and the central axis AX and connected to the first wall 51. In a cross-section of the lead-out pipe 50 cut in a direction orthogonal to the central axis AX, the first wall 51 is located between the inner wall 43 and the central axis AX, and the second wall 52 is located between the first wall 51 and the central axis AX. In this embodiment, as shown in the view as seen from the direction of arrow IV of FIG. 2 (see FIG. 4), the lead-out pipe 50 has a substantially C-shape when seen from the side of the leading end part 55. In other words, the lead-out pipe 50 has a shape of a double-walled pipe composed of an outer pipe facing the inner wall 43 of the supply pipe 42 and an inner pipe connected to the outer pipe and facing the central axis AX, with an opening 58 provided along the central axis AX to allow communication between an inside and an outside of the double-walled pipe. As shown in FIG. 2 to FIG. 5, a part of the lead-out pipe 50 on the opposite side of the leading end part 55 from the fuel cell stack 10 (this part will be hereinafter referred to as a base end part 56) is connected to the leading end part 32 of the hydrogen gas pipe 30 at two junctions 61, 62. In this embodiment, the leading end part 32 of the hydrogen gas pipe 30 is introduced into the supply pipe 42 and connected to the lead-out pipe 50 at the junction 61 and extends to the junction 62.

The lead-out pipe 50 has a first region 1 surrounded by the first wall 51 and the second wall 52. The first wall 51 and the second wall 52 of the lead-out pipe 50 are configured such that a second region 2 between the inner wall 43 and the first wall 51 and a third region 3 that is a region on the side of the central axis AX from the second wall 52 communicate with each other. In this embodiment, the second region 2 and the third region 3 communicate with each other through the opening 58 of the lead-out pipe 50 (see FIG. 4).

A hydrogen gas flows into the first region 1 from the junctions 61, 62. The hydrogen gas having flowed into the first region 1 is led out from the leading end part 55 of the lead-out pipe 50 into the supply pipe 42. A hydrogen off-gas supplied from the hydrogen pump 24 through the hydrogen off-gas pipe 41 flows through the second region 2 and the third region 3. The hydrogen gas flowing through the first region 1 and the hydrogen off-gas flowing through the second region 2 and the third region 3 merge and mix together in the merging zone 70 and then flow toward the fuel cell stack 10.

In this embodiment, the hydrogen off-gas supplied from the hydrogen pump 24 flows through the second region 2 between the inner wall 43 of the supply pipe 42 and the first wall 51 of the lead-out pipe 50 and through the third region 3 on the side of the central axis AX from the second wall 52. Thus, the temperature of the hydrogen gas flowing through the first region 1 surrounded by the first wall 51 and the second wall 52 of the lead-out pipe 50 can be raised by the hydrogen off-gas flowing through the second region 2 and the third region 3. A first advantage is thereby achieved that when the hydrogen gas having a lower temperature than the hydrogen off-gas and the hydrogen off-gas containing water and having a higher temperature than the hydrogen gas mix together, the water contained in the hydrogen off-gas is less likely to freeze.

Having the plurality of junctions 61, 62 at which the lead-out pipe 50 and the leading end part 32 of the hydrogen gas pipe 30 connect to each other, the flow passage structure of this embodiment can reduce the difference in the flow velocity of the hydrogen gas in the first region 1 in a circumferential direction and a radial direction centered on the central axis AX, compared with a structure having only one junction 61. Accordingly, this structure can reduce the difference in the hydrogen gas concentration in the circumferential direction and the radial direction centered on the central axis AX of the mixed gas of the hydrogen gas and the hydrogen off-gas that reaches the fuel cell stack 10, compared with a structure having only one junction. As the difference in the hydrogen gas concentration of the mixed gas reaching the cells 11 of the fuel cell stack 10 is thus reduced, it is less likely that a cell 11 in which the hydrogen gas concentration is lower than a desired concentration decreases in durability. As a result, a second advantage is achieved that variation in the durability among the cells 11 is less likely to occur.

Second Embodiment

Figure 6:
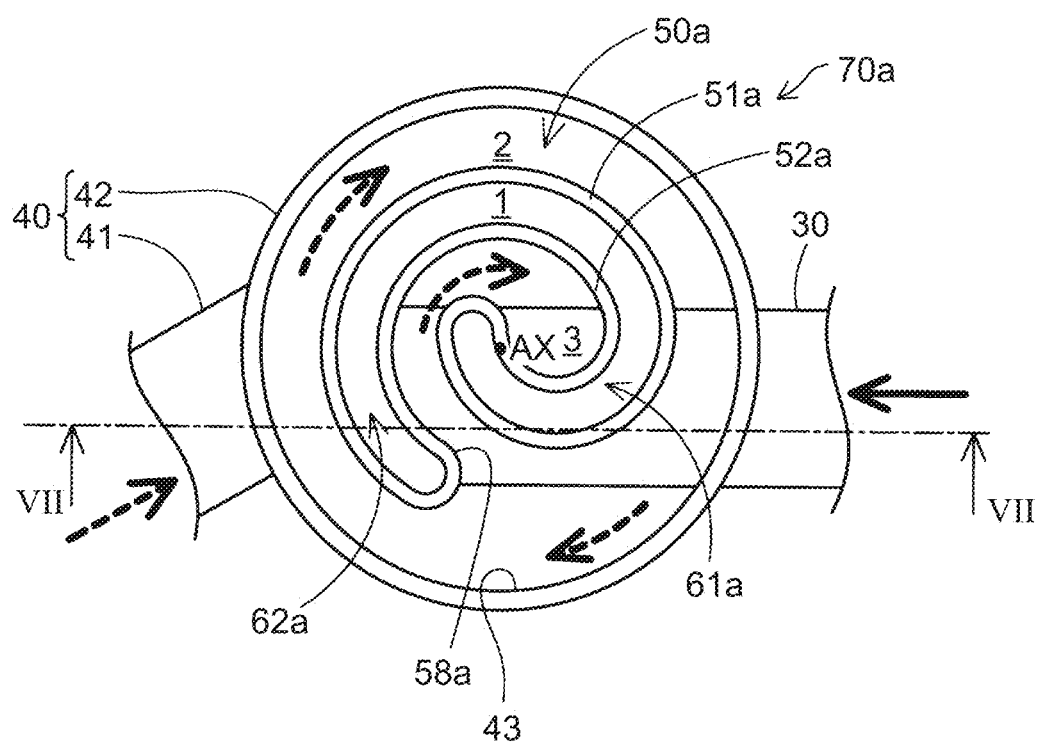
FIG. 6 is a view showing a flow passage structure in a merging zone of a second embodiment.
Figure 7:
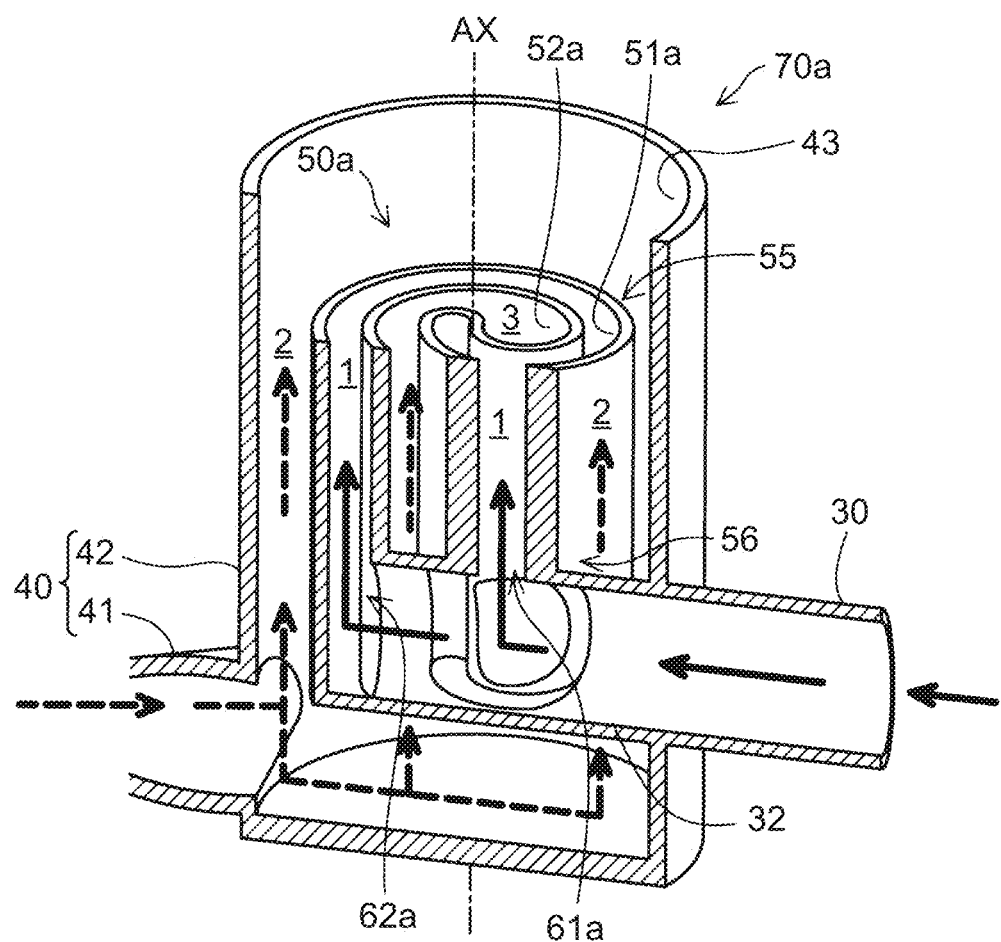
FIG. 7 is a sectional view taken along line VII-VII of FIG. 6.

FIG. 6 is a view showing a flow passage structure in a merging zone 70a of a second embodiment. FIG. 7 is a sectional view taken along line VII-VII of FIG. 6. FIG. 6 corresponds to FIG. 4 of the first embodiment, and FIG. 7 corresponds to FIG. 5 of the first embodiment. The second embodiment is different from the first embodiment in that, as shown in FIG. 6, a lead-out pipe 50a in the merging zone 70a has a spiral shape formed by a first wall 51a and a second wall 52a as seen from the side of the fuel cell stack 10. As in the first embodiment, the lead-out pipe 50a connects to the leading end part 32 of the hydrogen gas pipe 30 at a plurality of junctions 61a, 62a. As in the first embodiment, the lead-out pipe 50a is configured such that the first region 1 is formed that is surrounded by the first wall 51a and the second wall 52a connected to the first wall 51a and located between the first wall 51a and the central axis AX. Further, the lead-out pipe 50a is configured such that the second region 2 between the inner wall 43 and the first wall 51a and the third region 3 on the side of the central axis AX from the second wall 52a communicate with each other at an opening 58a. This embodiment can achieve the same advantages as the first embodiment.

Third Embodiment

Figure 8:
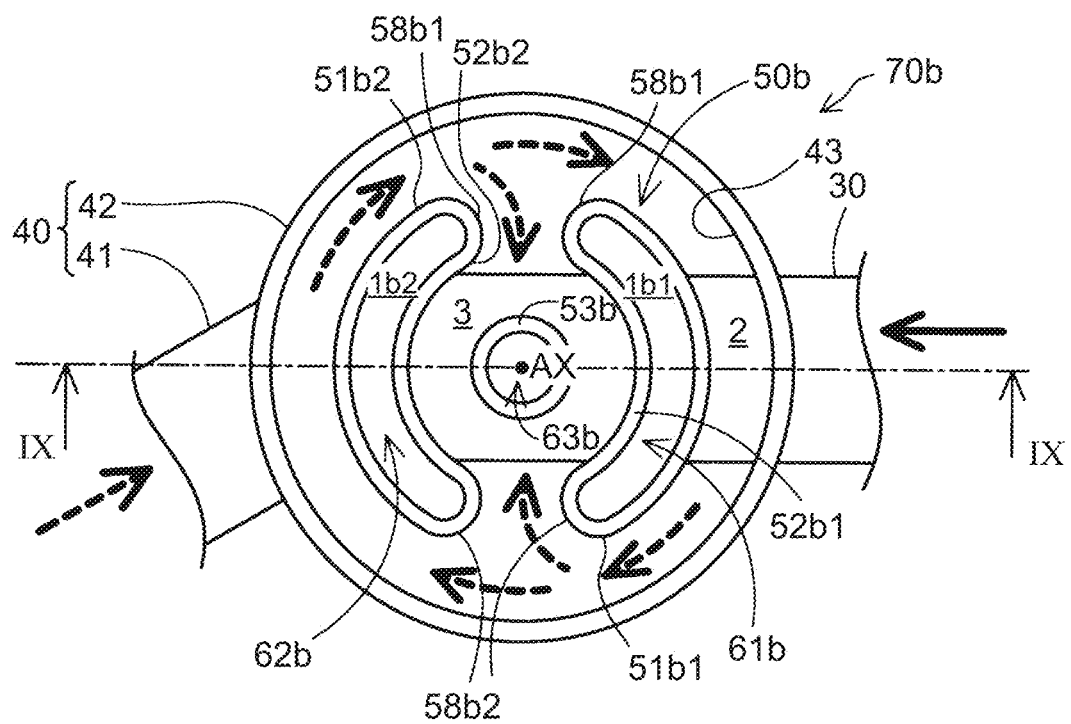
FIG. 8 is a view showing a flow passage structure in a merging zone of a third embodiment.
Figure 9:
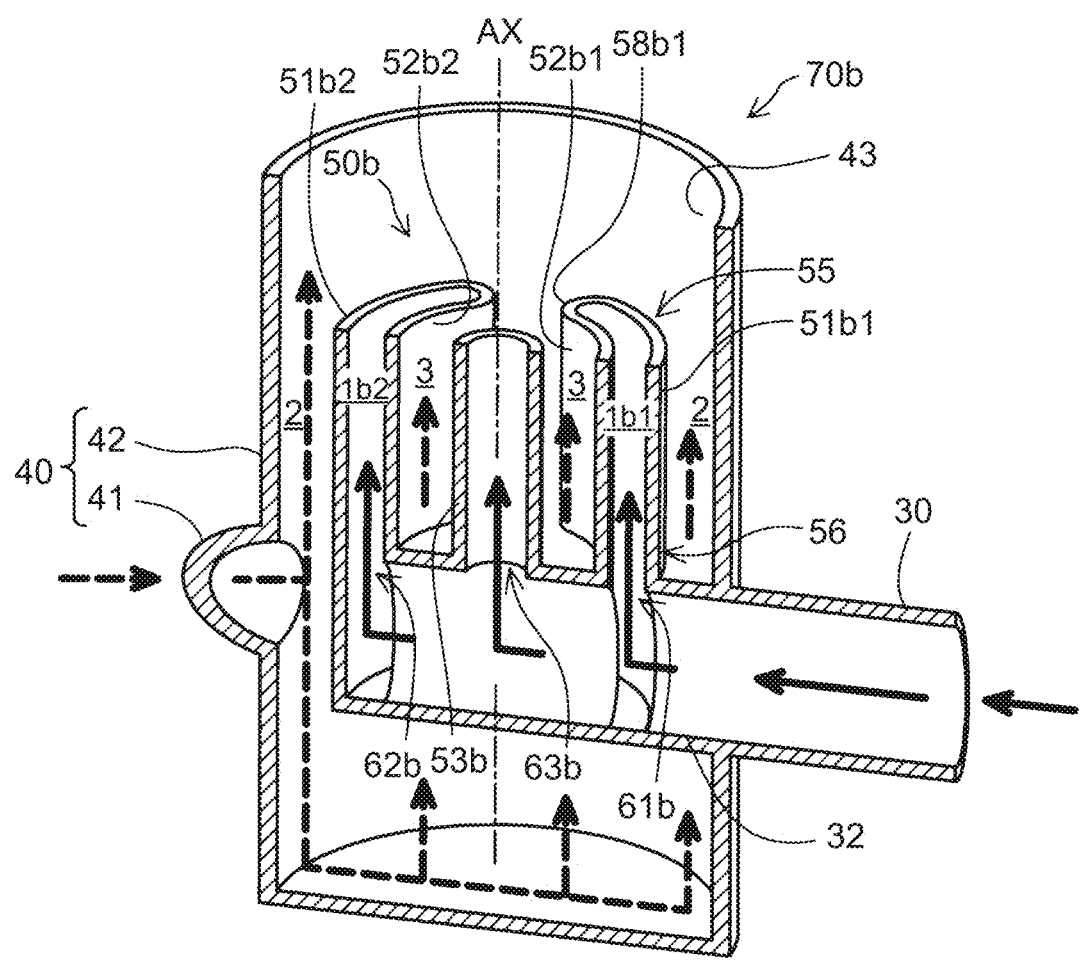
FIG. 9 is a sectional view taken along line IX-IX of FIG. 8.

FIG. 8 is a view showing a flow passage structure in a merging zone 70b of a third embodiment. FIG. 9 is a sectional view taken along line IX-IX of FIG. 8. FIG. 8 corresponds to FIG. 4 of the first embodiment, and FIG. 9 corresponds to FIG. 5 of the first embodiment. The third embodiment is different from the first embodiment in that a lead-out pipe 50b in the merging zone 70b has a plurality of divided first regions 1b1, 1b2 and is configured such that the second region 2 and the third region 3 communicate with each other at a plurality of points through portions between the divided first regions 1b1, 1b2, and in that, at the junctions 61b, 62b, the first regions 1b1, 1b2 respectively connect to the hydrogen gas pipe 30.

In this embodiment, the lead-out pipe 50b has a first wall 51b1 that faces a part of the inner wall 43 of the supply pipe 42 on an upstream side of the hydrogen gas pipe 30, and a second wall 52b1 that is connected to the first wall 51b1. Further, the lead-out pipe 50b has a first wall 51b2 that faces a part of the inner wall 43 of the supply pipe 42 on an upstream side of the hydrogen off-gas pipe 40, and a second wall 52b2 that is connected to the first wall 51b2. The first wall 51b1 and the second wall 52b1 form the first region 1b1. The first region 1b1 connects to the leading end part 32 of the hydrogen gas pipe 30 at the junction 61b. The first wall 51b2 and the second wall 52b2 form the first region 1b2. The first region 1b2 connects to the leading end part 32 of the hydrogen gas pipe 30 at the junction 62b. The lead-out pipe 50b has a shape of a double-walled pipe composed of an outer pipe facing the inner wall 43 of the supply pipe 42 and an inner pipe connected to the outer pipe and facing the central axis AX, with two openings 58b1, 58b2 provided to allow communication between an inside and an outside of the double-walled pipe. The third region 3 on the side of the central axis AX from the second walls 52b1, 52b2 communicates with the second region 2 between the first walls 51b1, 51b2 and the inner wall 43 through the openings 58b1, 58b2.

In this embodiment, the lead-out pipe 50b further includes a pipe 53b on a radially inner side of the second walls 52b1, 52b2. A base end part of the pipe 53b connects to the hydrogen gas pipe 30 at a junction 63b.

This embodiment can achieve the same first and second advantages as the first embodiment. Further, the lead-out pipe 50b has the plurality of first regions 1b1, 1b2 and is configured such that the second region 2 and the third region 3 communicate with each other at the plurality of openings 58b1, 58b2 through the portions between the divided first regions 1b1, 1b2. At the junctions 61b, 62b, the first regions 1b1, 1b2 respectively connect to the hydrogen gas pipe 30. Thus, the hydrogen off-gas can flow into the third region 3 formed on the radially inner side of the second walls 52b1, 52b2 of the lead-out pipe 50b through the openings 58b1, 58b2. A third advantage is thereby achieved that as the temperature of the hydrogen gas flowing through the first regions 1b1, 1b2 can be further raised, merging of the relatively low-temperature hydrogen gas and the relatively high-temperature hydrogen off-gas is even less likely to result in freezing of water contained in the hydrogen off-gas.

Fourth Embodiment

Figure 10:
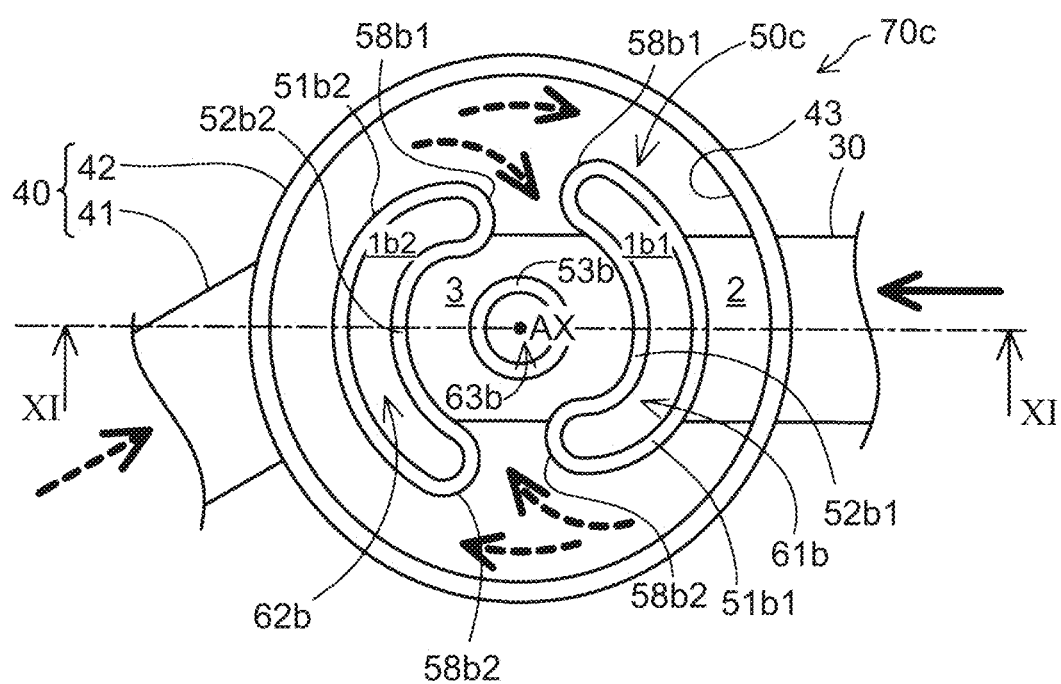
FIG. 10 is a view showing a flow passage structure in a merging zone of a fourth embodiment.
Figure 11:
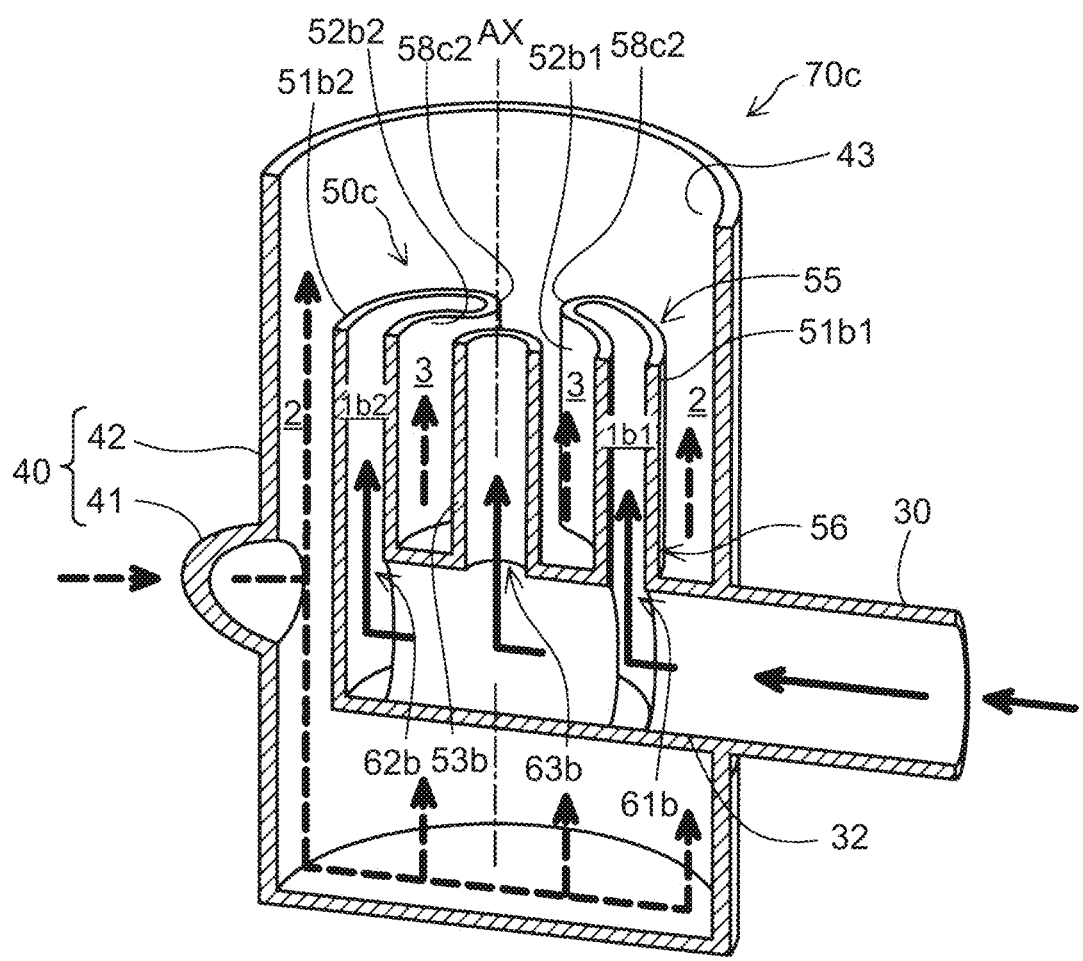
FIG. 11 is a sectional view taken along line XI-XI of FIG. 10.

FIG. 10 is a view showing a flow passage structure in a merging zone 70c of a fourth embodiment. FIG. 11 is a sectional view taken along line XI-XI of FIG. 10. FIG. 10 corresponds to FIG. 8 of the third embodiment, and FIG. 11 corresponds to FIG. 9 of the third embodiment. A lead-out pipe 50c of the fourth embodiment has a structure in which the first region 1b2 is bent toward the central axis AX near the opening 58b1. Similarly in the structure, the first region 1b1 is bent toward the central axis AX near the opening 58b2. The flow passage structure in the merging zone 70c is otherwise the same as in the third embodiment and therefore will not be further described. This embodiment can achieve the same advantages as the third embodiment.

Fifth Embodiment

Figure 12:
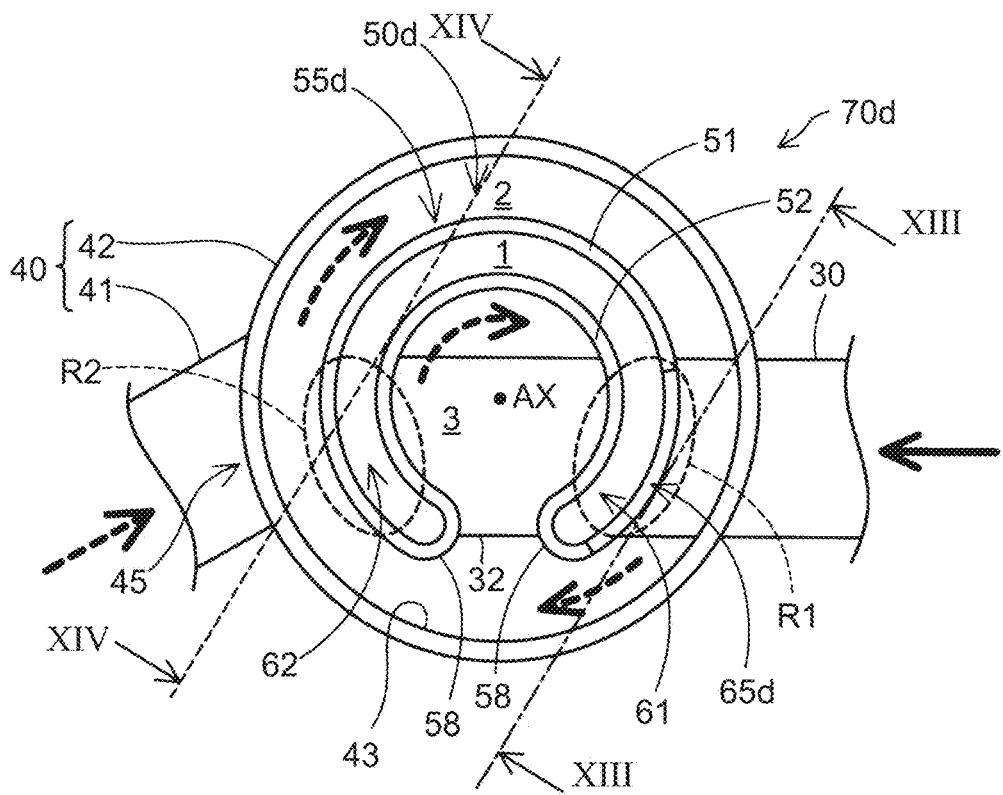
FIG. 12 is a view showing a flow passage structure in a merging zone of a fifth embodiment.
Figure 13:
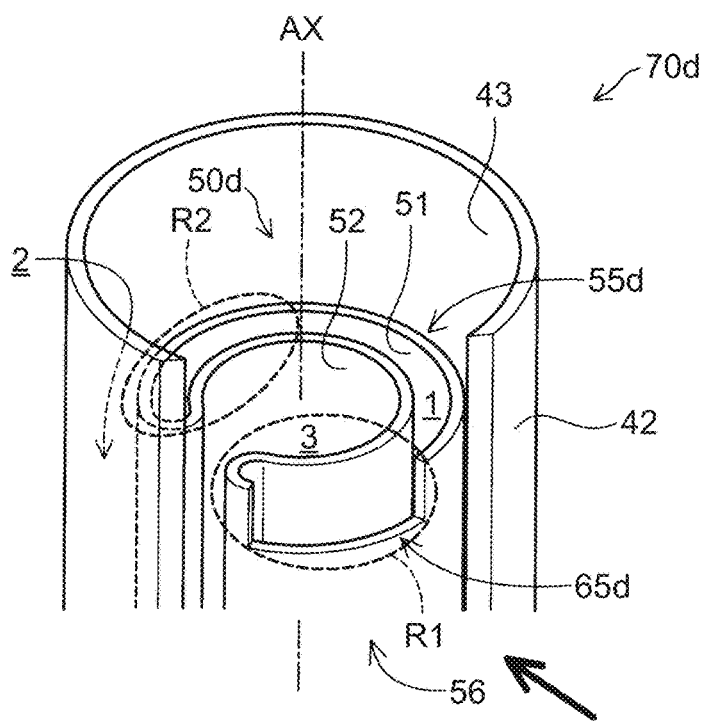
FIG. 13 is a sectional view taken along line XIII-XIII of FIG. 12.

FIG. 12 is a view showing a flow passage structure in a merging zone 70d of a fifth embodiment. FIG. 12 corresponds to FIG. 4 of the first embodiment. FIG. 13 is a sectional view taken along line XIII-XIII of FIG. 12. In FIG. 13, the structure of a leading end part 55d of a lead-out pipe 50d is mainly shown, while other parts of the structure are simplified or omitted. Positions R1, R2 circled with the dashed lines in FIG. 12 indicate positions in the leading end part 55d that correspond respectively to the positions of the junctions 61, 62. The position R1 is a position shifted from the junction 61 toward the side of the leading end part 55d in a direction parallel to the central axis AX. The position R2 is a position shifted from the junction 62 toward the side of leading end part 55d in a direction parallel to the central axis AX. The position R1 in the leading end part 55d and the position in the base end part 56 at which the junction 61 is provided substantially coincide with each other in the radial direction. Similarly, the position R2 in the leading end part 55d and the position in the base end part 56 at which the junction 62 is provided substantially coincide with each other in the radial direction.

In this embodiment, the leading end part 55d of the lead-out pipe 50d is formed such that the length of the first wall 51 along the central axis AX is shorter at the position R1 than at a position that does not correspond to the position of the junction 61. The lead-out pipe 50d has, at the position R1 in the leading end part 55d, a step 65d that is formed in the first wall 51 so as to make the length of the wall along the central axis AX shorter at the step 65d than at other portions. In this embodiment, as shown in FIG. 12, of the two positions R1, R2 corresponding to the positions of the junctions 61, 62, the step 65d is provided at the position R1 that is located on the opposite side of the central axis AX from an inflow point 45 at which the hydrogen off-gas flows into the supply pipe 42. The flow passage structure in the merging zone 70d is otherwise the same as in the first embodiment and therefore will not be further described.

The thick arrow on the center right side in FIG. 12 indicates a flow of the hydrogen gas in the hydrogen gas pipe 30. The thick arrow on the lower right side in FIG. 13 indicates a flow of the hydrogen gas in the hydrogen gas pipe 30. The junction 61 is a portion where the hydrogen gas from the hydrogen gas pipe 30 flows directly into the lead-out pipe 50d. Therefore, in the leading end part 55d of the lead-out pipe 50d, the hydrogen gas led out into the supply pipe 42 may flow at a higher velocity at the positions that correspond to the positions of the junctions 61, 62 than at a position that does not correspond to the position of the junction 61. This may result in the flow velocity of the hydrogen gas in the first region 1 differing greatly in the circumferential direction centered on the central axis AX. In this embodiment, the leading end part 55d of the lead-out pipe 50d is formed such that the length of at least one of the first wall 51 and the second wall 52 is shorter at the position R1 than at a position that does not correspond to the position of the junction 61. Thus, the hydrogen gas led out into the supply pipe 42 is less likely to flow at a higher velocity at the position R1 corresponding to the position of the junction 61 than at other positions. Accordingly, the difference in the flow velocity of the hydrogen gas in the first region 1 of the lead-out pipe 50d in the circumferential direction centered on the central axis AX can be reduced, so that the difference in the hydrogen gas concentration in the mixed gas of the hydrogen gas and the hydrogen off-gas that reaches the fuel cell stack 10 can be reduced. As the difference in the hydrogen gas concentration of the mixed gas reaching the cells 11 of the fuel cell stack 10 is thus reduced, it is less likely that a cell 11 in which the hydrogen gas concentration is lower than a desired concentration decreases in durability. As a result, a fourth advantage is achieved that variation in the durability among the cells 11 is less likely to occur.

When the leading end part 55d of the lead-out pipe 50d is formed such that the length of at least one of the first wall 51 and the second wall 52 is shorter, the hydrogen off-gas may flow into the first region 1 from the portion where the wall is shorter. In this embodiment, the length of at least one of the first wall 51 and the second wall 52 is shorter at the position R1 on the opposite side of the central axis AX from the inflow point 45 at which the hydrogen off-gas flows into the supply pipe 42 than at a position that does not correspond to the position of the junction 61. Thus, compared with when the length of at least one of the first wall 51 and the second wall 52 is shorter at the position R2 that is located on the side closer to the inflow point 45 of the hydrogen off-gas, i.e., the opposite side of the central axis AX from the position R1, the hydrogen off-gas is less likely to flow into the first region 1 from the portion where the wall is shorter. A fifth advantage is thereby achieved that the flow of the hydrogen gas in the first region 1 is less likely to be obstructed by the hydrogen off-gas.

Further, in this embodiment, the hydrogen off-gas supplied from the hydrogen off-gas pipe 41 flows through the second region between the inner wall 43 of the supply pipe 42 and the first wall 51 of the lead-out pipe 50d and through the third region 3 on an inner side of the lead-out pipe 50d. Therefore, the temperature of the hydrogen gas flowing through the first region 1 inside the lead-out pipe 50d surrounded by the first wall 51 and the second wall 52 of the lead-out pipe 50d can be raised by the hydrogen off-gas flowing through the second region 2 and the third region 3. Thus, the same first advantage as that described in the first embodiment can be achieved.

Having the plurality of junctions 61, 62 at which the base end part 56 of the lead-out pipe 50d and the hydrogen gas pipe 30 connect to each other, the flow passage structure of this embodiment can reduce the difference in the flow velocity of the hydrogen gas in the first region 1, compared with a structure having only one junction. Thus, the same second advantage as that described in the first embodiment can be achieved.

Sixth Embodiment

Figure 14:
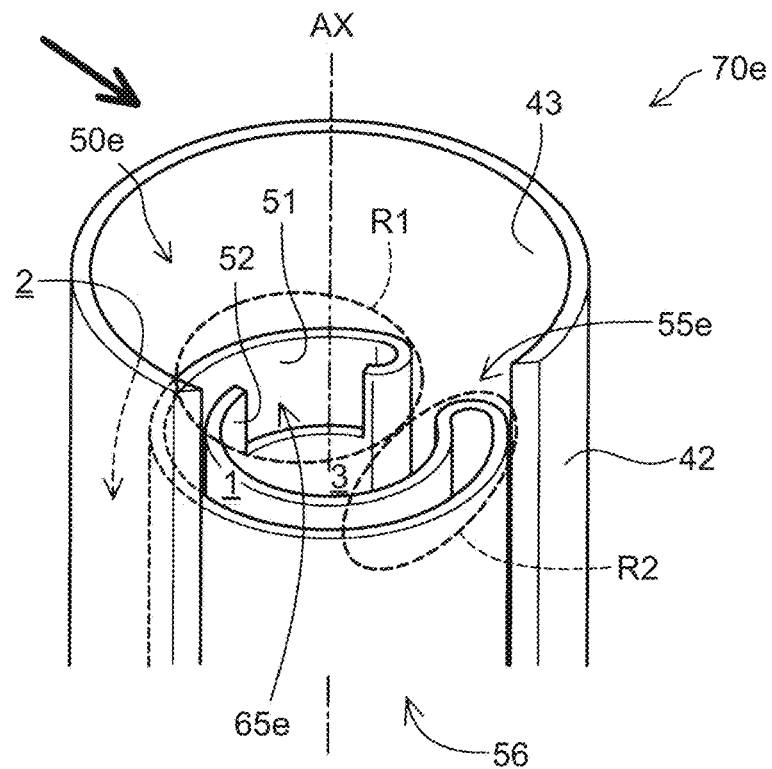
FIG. 14 is a view showing a flow passage structure in a merging zone of a sixth embodiment.

FIG. 14 is a view showing a flow passage structure in a merging zone 70e of a sixth embodiment. FIG. 14 shows the flow passage structure in the merging zone 70e from a direction 180° around the central axis AX different from the direction in which FIG. 13 of the fifth embodiment shows the flow passage structure in the merging zone 70d. Therefore, the portion of the supply pipe 42 cut away in FIG. 14 is different from the portion of the supply pipe 42 cut away in FIG. 13. For reference, a direction corresponding to the direction in which FIG. 14 shows the merging zone 70e is indicated by dashed line XIV-XIV in FIG. 12. The thick arrow on the upper left side in FIG. 14 indicates a flow of the hydrogen gas in the hydrogen gas pipe 30. In this embodiment, a leading end part 55e of a lead-out pipe 50e is formed such that the length of the second wall 52 along the central axis AX is shorter at the position R1 that corresponds to the position of the junction 61 than at a position that does not. The lead-out pipe 50e has, at the position R1 in the leading end part 55e, a step 65e that is formed in the second wall 52 so as to make the length of the wall in an axial direction shorter at the step 65e than at other portions. The flow passage structure in the merging zone 70e is otherwise the same as in the fifth embodiment and therefore will not be further described. This embodiment can achieve the same first, second, and fourth advantages as the fifth embodiment.

Seventh Embodiment

Figure 15:
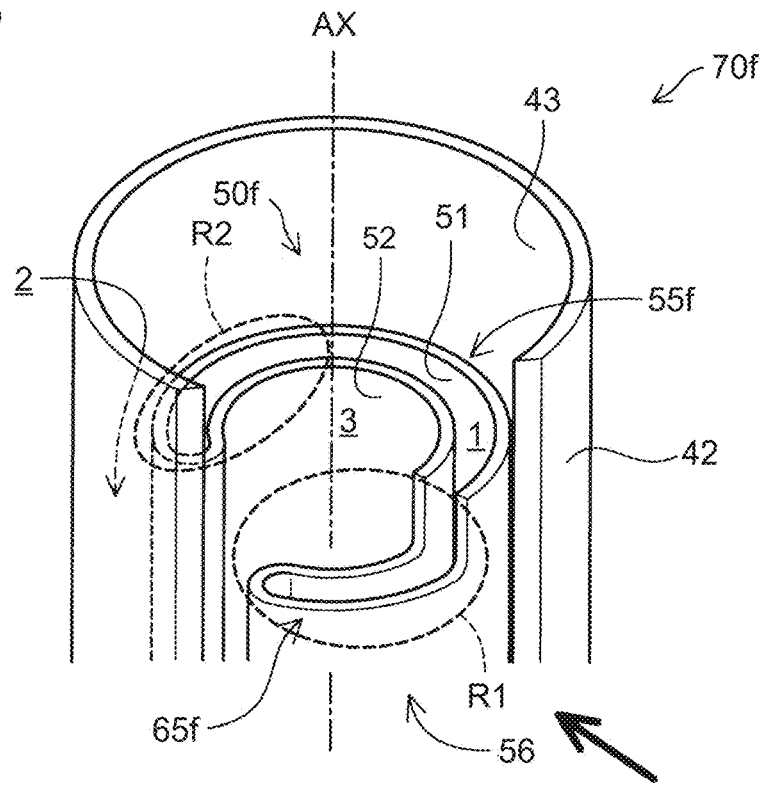
FIG. 15 is a view showing a flow passage structure in a merging zone of a seventh embodiment.

FIG. 15 is a view showing a flow passage structure in a merging zone 70f of a seventh embodiment. FIG. 15 corresponds to FIG. 13 of the fifth embodiment. In this embodiment, a leading end part 55f of a lead-out pipe 50f is formed such that the lengths of the first wall 51 and the second wall 52 along the central axis AX are shorter at the position R1 that corresponds to the position of the junction 61 than at a position that does not. The lead-out pipe 50f has, at the position R1 in the leading end part 55f, a step 65f that is formed in the first wall 51 and the second wall 52 so as to make the lengths of the walls in the axial direction shorter at the step 65f than at other portions. The flow passage structure in the merging zone 70f is otherwise the same as in the fifth embodiment and therefore will not be further described. This embodiment can achieve the same advantages as the fifth embodiment.

Eighth Embodiment

Figure 16:
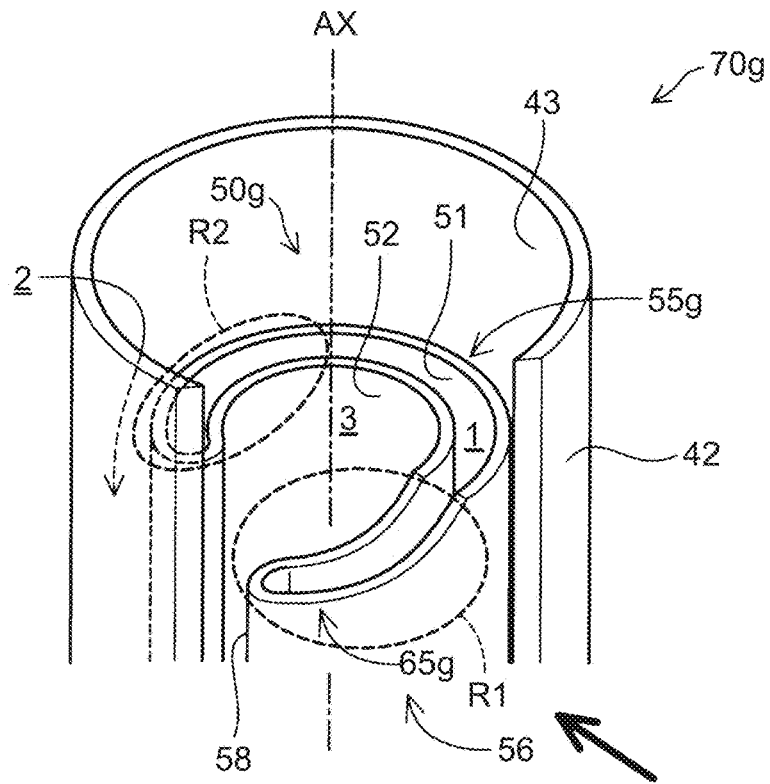
FIG. 16 is a view showing a flow passage structure in a merging zone of an eighth embodiment.

FIG. 16 is a view showing a flow passage structure in a merging zone 70g of an eighth embodiment. FIG. 16 corresponds to FIG. 13 of the fifth embodiment. In this embodiment, a leading end part 55g of a lead-out pipe 50g has, at the position R1 corresponding to the position of the junction 61, a step 65g that is formed such that the lengths of the first wall 51 and the second wall 52 along the central axis AX decrease gradually from a position that does not correspond to the position of the junction 61 toward the opening 58. The flow passage structure in the merging zone 70g is otherwise the same as in the fifth embodiment and therefore will not be further described. This embodiment can achieve the same advantages as the fifth embodiment.

Ninth Embodiment

Figure 17:
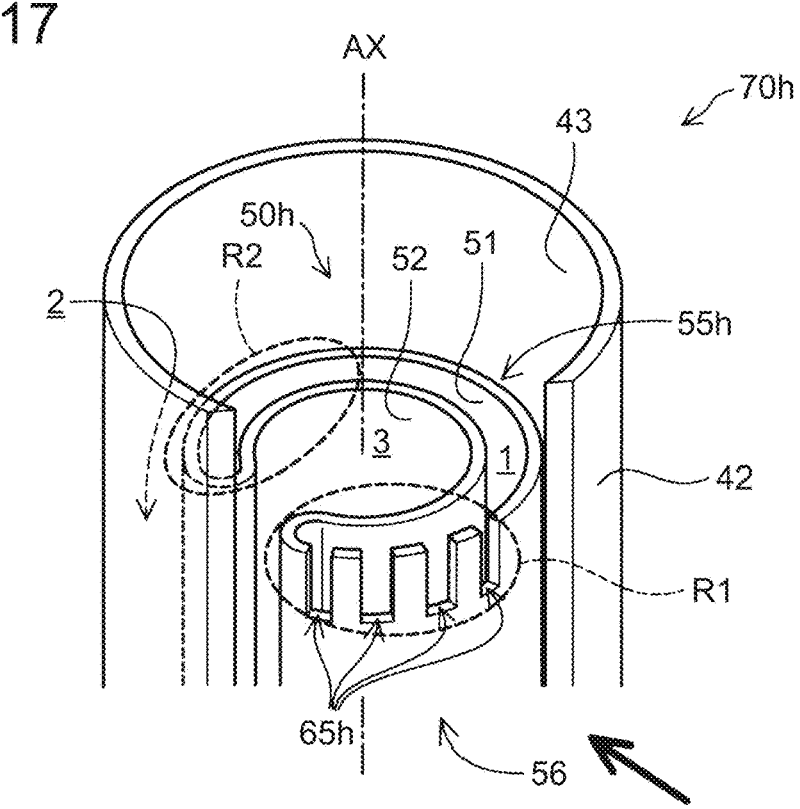
FIG. 17 is a view showing a flow passage structure in a merging zone of a ninth embodiment.

FIG. 17 is a view showing a flow passage structure in a merging zone 70h of a ninth embodiment. FIG. 17 corresponds to FIG. 13 of the fifth embodiment. In this embodiment, a leading end part 55h of a lead-out pipe 50h has, at the position R1 corresponding to the position of the junction 61, a plurality of steps 65h that is formed so as to make the length of the first wall 51 along the central axis AX shorter at the steps 65h than at a position that does not correspond to the position of the junction 61. The flow passage structure in the merging zone 70h is otherwise the same as in the fifth embodiment and therefore will not be further described. This embodiment can achieve the same advantages as the fifth embodiment.

Tenth Embodiment

Figure 18:
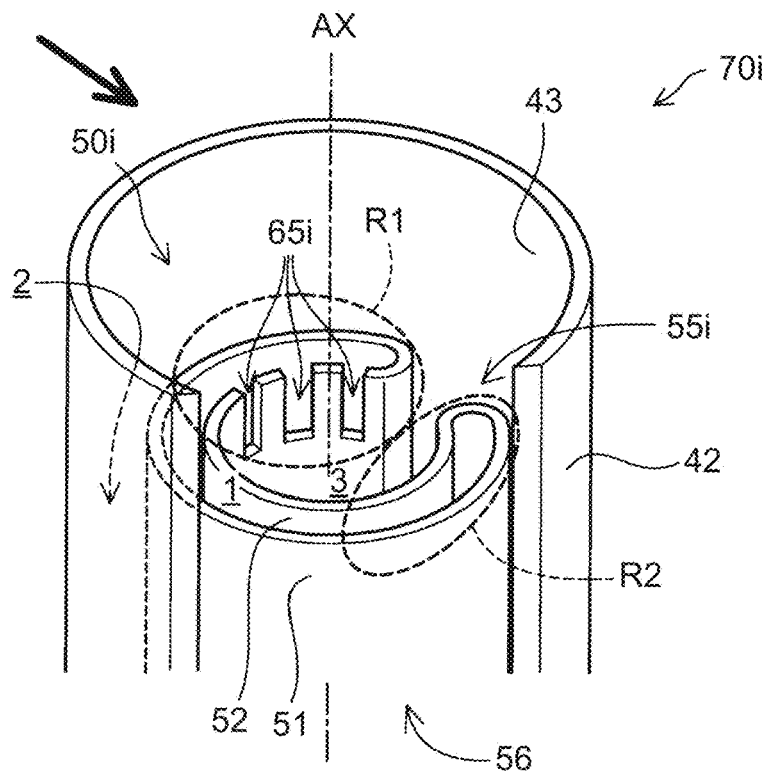
FIG. 18 is a view showing a flow passage structure in a merging zone of a tenth embodiment.

FIG. 18 is a view showing a flow passage structure in a merging zone 70i of a tenth embodiment. FIG. 18 corresponds to FIG. 14 of the sixth embodiment. In this embodiment, a leading end part 55i of a lead-out pipe 50i has, at the position R1 corresponding to the position of the junction 61, a plurality of steps 65i that is formed so as to make the length of the second wall 52 along the central axis AX shorter at the steps 65i than at a position that does not correspond to the position of the junction 61. The flow passage structure in the merging zone 70i is otherwise the same as in the sixth embodiment and therefore will not be further described. This embodiment can achieve the same advantages as the sixth embodiment.

Eleventh Embodiment

Figure 19:
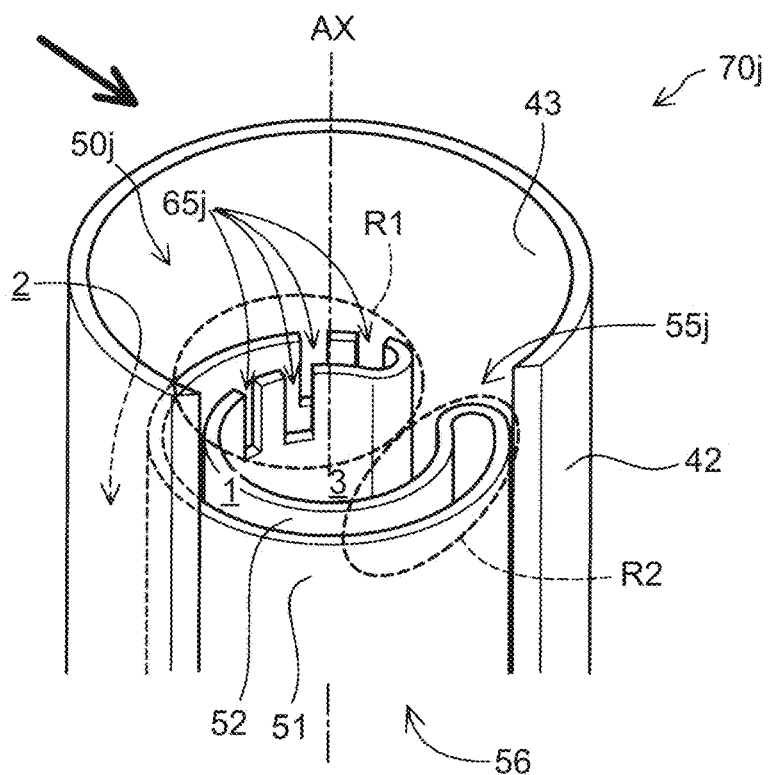
FIG. 19 is a view showing a flow passage structure in a merging zone of an eleventh embodiment.

FIG. 19 is a view showing a flow passage structure in a merging zone 70j of an eleventh embodiment. FIG. 19 corresponds to FIG. 14 of the sixth embodiment. In this embodiment, a leading end part 55j of a lead-out pipe 50j has, at the position R1 corresponding to the position of the junction 61, a plurality of steps 65j that is formed so as to make the lengths of the first wall 51 and the second wall 52 along the central axis AX shorter at the steps 65j than at a position that does not correspond to the position of the junction 61. The flow passage structure in the merging zone 70j is otherwise the same as in the tenth embodiment and therefore will not be further described. This embodiment can achieve the same advantages as the tenth embodiment.

Analysis of Flow Velocity of Hydrogen Gas in First Region 1

Figure 20:
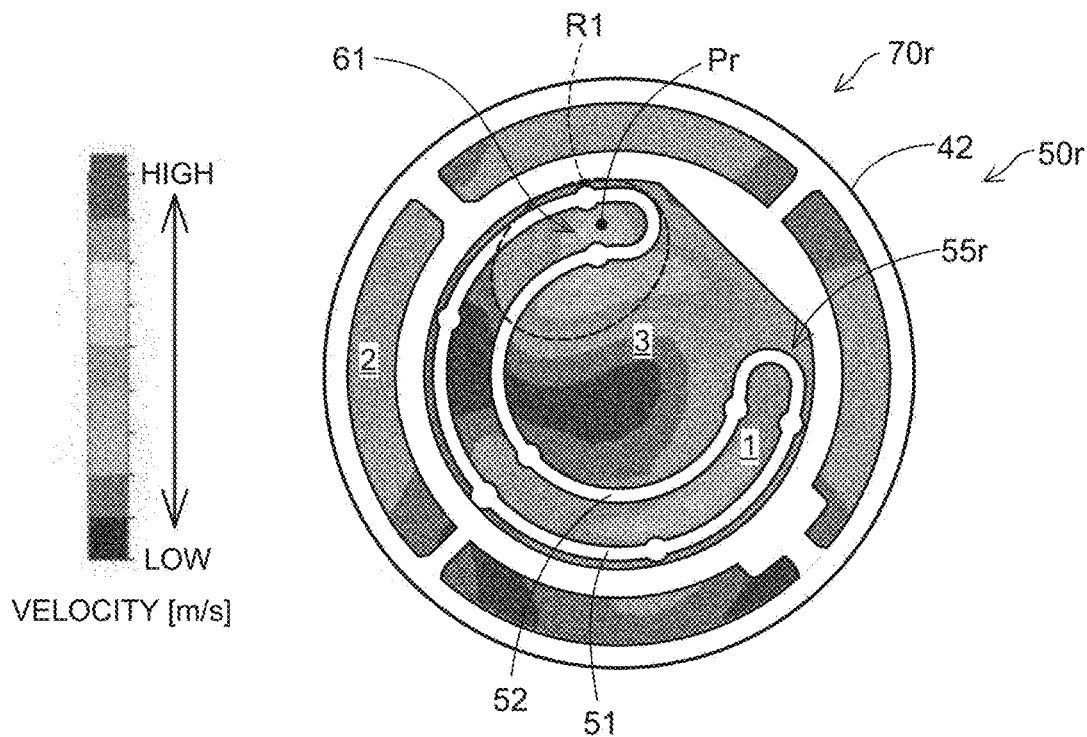
FIG. 20 is a chart showing a result of an analysis of gas flow velocity in a leading end part of a lead-out pipe of a reference example.
Figure 21:
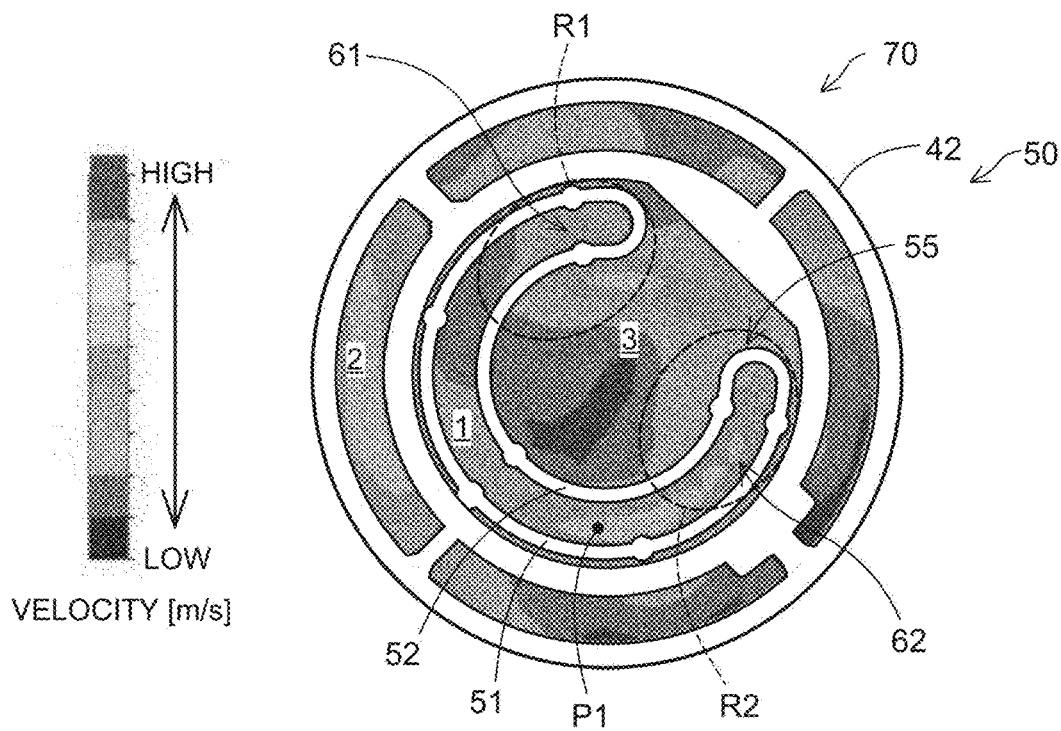
FIG. 21 is a chart showing a result of an analysis of gas flow velocity in a leading end part of a lead-out pipe of the first embodiment.
Figure 22:
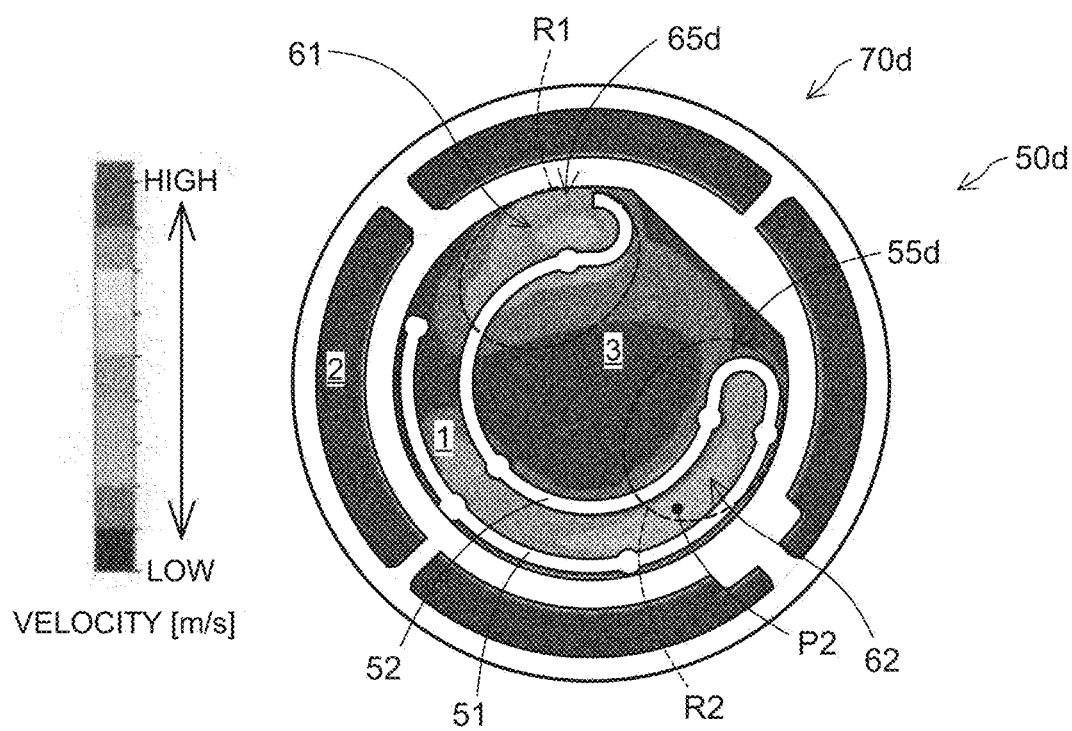
FIG. 22 is a chart showing a result of an analysis of gas flow velocity in a leading end part of a lead-out pipe of the fifth embodiment.

FIG. 20 to FIG. 22 are charts showing results of a CAE analysis of gas flow velocity (velocity (m/s)) to illustrate the advantages achieved by employing the flow passage structures of the above embodiments in the fuel cell system 100. FIG. 20 shows a merging zone 70r including a leading end part 55r of a lead-out pipe 50r that connects to the hydrogen gas pipe 30 at one junction 61. The position R1 indicated in FIG. 20 is the position in the leading end part 55r that corresponds to the junction 61. FIG. 21 corresponds to FIG. 4 of the first embodiment, and shows the merging zone 70 including the leading end part 55 of the lead-out pipe 50 that connects to the hydrogen gas pipe 30 at the two junctions 61, 62. The positions R1, R2 indicated in FIG. 21 are the positions in the leading end part 55 that correspond respectively to the junctions 61, 62. The points Pr and P1 in FIG. 20 and FIG. 21 indicate the points of the maximum gas flow velocities in the first regions 1 of the lead-out pipes 50r, 50. A comparison between FIG. 20 and FIG. 21 shows that the difference between the value of the maximum flow velocity and the value of the minimum flow velocity is smaller in the flow passage structure having the plurality of junctions 61, 62 (see FIG. 21) than the structure having only one junction 61 (see FIG. 20). In the first region 1 shown in FIG. 21, the value of the maximum flow velocity of the hydrogen gas is about 16% lower than that in the first region 1 of FIG. 20. This demonstrates the second advantage of a flow passage structure having a plurality of junctions that it can reduce the difference in the flow velocity of the hydrogen gas in the first region 1 compared with a structure having only one junction.

FIG. 22 corresponds to FIG. 13 of the fifth embodiment, and shows the merging zone 70d including the leading end part 55d of the lead-out pipe 50d that connects to the hydrogen gas pipe 30 at the two junctions 61, 62. The positions R1, R2 indicated in FIG. 22 are the positions in the leading end part 55d that correspond respectively to the junctions 61, 62. The leading end part 55d of the lead-out pipe 50d shown in FIG. 22 has, at the position R1 corresponding to the position of the junction 61, the step 65d that is formed so as to make the length of the first wall 51 along the central axis AX shorter at the step 65d than at a position that does not correspond to the position of the junction 61. The point P2 in FIG. 22 indicates the point of the maximum flow velocity in the first region 1 of the lead-out pipe 50d. In FIG. 22, the flow velocity is lower at the position R1 in the leading end part 55d where the step 65d is provided than at the position R2. The difference between the value of the maximum flow velocity and the value of the minimum flow velocity in FIG. 22 is smaller than that in FIG. 20. This demonstrates that making the length of at least one of the first wall 51 and the second wall 52 along the central axis AX shorter at the position R1 that corresponds to the position of the junction 61 than at a position that does not can achieve the fourth advantage that the flow velocity of the hydrogen gas at the position R1 corresponding to the position of the junction 61 can be reduced and that, as a result, the difference in the flow velocity of the hydrogen gas can be reduced.

A comparison between the flow velocity in the first region 1 of the lead-out pipe 50r in FIG. 20 and that in the first region 1 of the lead-out pipe 50d in FIG. 22 shows that the value of the maximum flow velocity in the first region 1 of the lead-out pipe 50d is about 6% lower.

Other Embodiments

In the first to fourth embodiments, the lead-out pipes 50 to 50c connect to the hydrogen gas pipe 30 at the two junctions 61, 62; 61a, 62a. However, the number of the junctions in the first to fourth embodiments may be any number larger than one, and may be three or larger. The shape of the hydrogen gas pipe 30 is not limited to that shown in the first to fourth embodiments, as long as the hydrogen gas pipe 30 connects to the lead-out pipes 50 to 50c at the junctions 61, 61a and extends to the junctions 62, 62a.

In the fifth to eleventh embodiments, the lead-out pipes 50d to 50j connect to the hydrogen gas pipe 30 at the plurality of junctions 61, 62. However, in the fifth to eleventh embodiments, the lead-out pipes 50d to 50j may connect to the hydrogen gas pipe 30 at one junction. Also in this case, these embodiments can achieve the fourth advantage that the difference in the hydrogen gas concentration in the first region 1 in the circumferential direction centered on the central axis AX can be reduced by the steps 65d to 65j.

In the fifth to eleventh embodiments, the lead-out pipes 50d to 50j may be formed such that the length of at least one of the first wall 51 and the second wall 52 in the leading end parts 55d to 55j is shorter at each of the positions R1, R2 that correspond respectively to the positions of the junctions 61, 62.

The lead-out pipes 50b, 50c of the third and fourth embodiments having the plurality of first regions 1b1, 1b2 may include the steps 65d to 65j described in the fifth to eleventh embodiments at positions corresponding to the positions of the junctions 61b, 62b.

In the above embodiments, the fuel cell system 100 is installed in a vehicle. However, the fuel cell system 100 may also be installed in a moving body other than a vehicle, such as a ship, train, or robot, or may be stationarily installed.

This disclosure is not limited to the above embodiments but can be implemented in various configurations within the scope of the gist of the disclosure. For example, to solve part or the whole of the above-described challenge or to achieve some or all of the above-described advantages, the technical features of the embodiments and the other embodiments corresponding to the technical features of the forms described in the section SUMMARY can be substituted or combined as appropriate. Any of these technical features that are not described as essential in this specification can be omitted as appropriate.

What is claimed is:

1. A flow passage structure employed in a fuel cell system to supply to a fuel cell stack a hydrogen gas supplied from a hydrogen gas supply source and a hydrogen off-gas supplied from a hydrogen pump, the flow passage structure comprising:
   a hydrogen gas pipe connected to the hydrogen gas supply source;
   a hydrogen off-gas pipe connected to the hydrogen pump;
   a supply pipe which connects the hydrogen off-gas pipe and the fuel cell stack to each other, into which a leading end part of the hydrogen gas pipe is introduced, and through which a mixed gas of the hydrogen gas from the hydrogen gas pipe and the hydrogen off-gas from the hydrogen off-gas pipe is supplied to the fuel cell stack;
   a lead-out pipe that is disposed inside the supply pipe along a central axis of the supply pipe to lead out the hydrogen gas from the hydrogen gas pipe into the supply pipe, the lead-out pipe including a first wall located between an inner wall and the central axis of the supply pipe, a second wall connected to the first wall and located between the first wall and the central axis, and a first region surrounded by the first wall and the second wall, the lead-out pipe being configured such that a second region between the inner wall and the first wall and a third region on a side of the central axis from the second wall communicate with each other; and
   a plurality of junctions at which the first region and the leading end part of the hydrogen gas pipe communicate with and connect to each other.

2. The flow passage structure according to claim 1, wherein:
   the lead-out pipe has a plurality of divided first regions, and is configured such that the second region and the third region communicate with each other at a plurality of points through portions between the divided first regions; and
   at each of the junctions, one of the divided first regions and the leading end part of the hydrogen gas pipe connect to each other.

3. A flow passage structure employed in a fuel cell system to supply to a fuel cell stack a hydrogen gas supplied from a hydrogen gas supply source and a hydrogen off-gas supplied from a hydrogen pump, the flow passage structure comprising:
   a hydrogen gas pipe connected to the hydrogen gas supply source;
   a hydrogen off-gas pipe connected to the hydrogen pump;
   a supply pipe which connects the hydrogen off-gas pipe and the fuel cell stack to each other, into which a leading end part of the hydrogen gas pipe is introduced, and through which a mixed gas of the hydrogen gas from the hydrogen gas pipe and the hydrogen off-gas from the hydrogen off-gas pipe is supplied to the fuel cell stack;
   a lead-out pipe that is disposed inside the supply pipe along a central axis of the supply pipe to lead out the hydrogen gas from the hydrogen gas pipe into the supply pipe, the lead-out pipe including a first wall located between an inner wall and the central axis of the supply pipe, a second wall connected to the first wall and located between the first wall and the central axis, and a first region surrounded by the first wall and the second wall, the lead-out pipe being configured such that a second region between the inner wall and the first wall and a third region on a side of the central axis from the second wall communicate with each other; and a junction at which the first region and the leading end part of the hydrogen gas pipe communicate with and connect to each other, wherein the lead-out pipe is formed such that a length of at least one of the first wall and the second wall along the central axis is shorter at a position in a leading end part of the lead-out pipe that corresponds to a position of the junction than at a position that does not.

4. The flow passage structure according to claim 3, wherein:

the first region and the leading end part of the hydrogen gas pipe communicate with and connect to each other at the junction, at least on the opposite side of the central axis from an inflow point at which the hydrogen off-gas flows from the hydrogen off-gas pipe into the supply pipe; and the lead-out pipe is formed such that the length of at least one of the first wall and the second wall along the central axis is shorter at least at a position in the leading end part of the lead-out pipe that corresponds to a position of the junction on the opposite side from the inflow point than at a position that does not.

5. The flow passage structure according to claim 3, wherein the first region and the leading end part of the hydrogen gas pipe connect to each other at a plurality of junctions.

\* \* \* \* \*